UNITED STATES PATENT OFFICE.

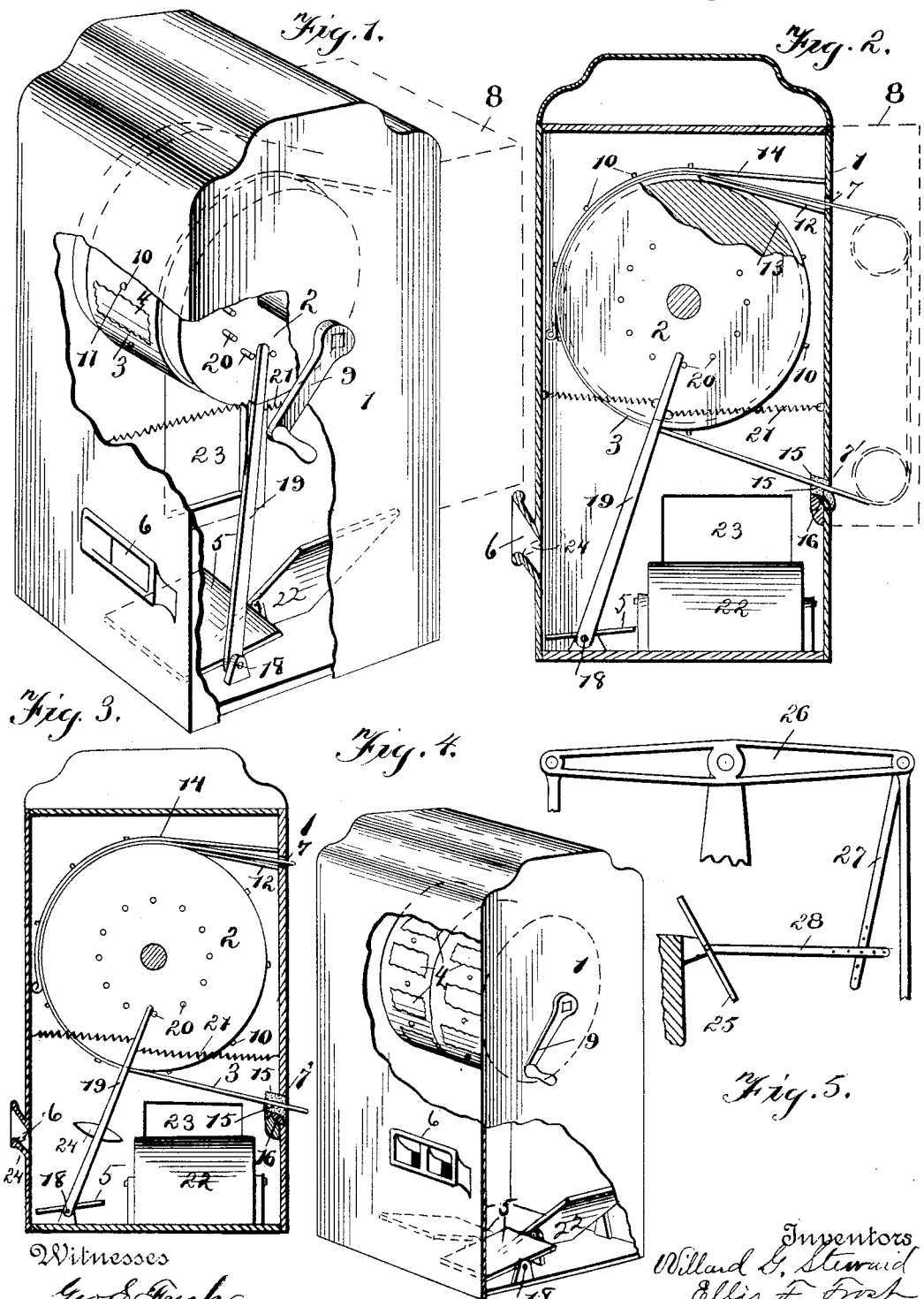

WILLARD G. STEWARD AND ELLIS F. FROST, OF WASHINGTON, DISTRICT OF COLUMBIA, ASSIGNORS TO CHARLES M. CAMPBELL, OF SAME PLACE.

KINETOSCOPE.

SPECIFICATION forming part of Letters Patent No. 588,916, dated August 24, 1897.

Application filed June 1, 1896. Serial No. 593,912. (No model.)

*To all whom it may concern:*

Be it known that we, WILLARD G. STEWARD and ELLIS F. FROST, citizens of the United States, residing at Washington, in the District of Columbia, have invented certain new and useful Improvements in Kinetoscopes; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to optics; and it consists in the method of and apparatus for causing rays of light from a moving object, each to be held stationary through a given point. One means for accomplishing this object is fully described hereinafter and disclosed in the accompanying drawings, in which—

Figure 1 is a perspective view, partially broken away, of one form of an instrument embodying our invention. Fig. 2 is a vertical sectional view of the same, and Figs. 3, 4, and 5 are detail views.

Referring more particularly to the drawings, 1 indicates the box or casing, in which a wheel or roller 2 is mounted. Over this wheel is caused to pass a transparency 3 or other continuous strip of material provided with objects, pictures, or negatives 4.

5 indicates a reflector which is arranged in the box in such relative position to the wheel or roller as that the rays of light from the strip may be seen through the window or aperture 6 in the side of the box. These parts may be of such size and shape and arranged in such relation to each other as to secure the desired result. When it is desired to show a long series of pictures, the box may be made of a sufficient capacity to receive the entire length of the strip, or the box may be provided with slots or apertures 7 and 7', through which the strip may pass into and be stored in a separate compartment 8, (shown only in dotted lines,) or the strip may be permitted to run loosely upon the outside of the box.

The pictures or objects may be secured to or arranged upon the strip at intervals, so that as the wheel or roller is rotated by means of the crank 9 or any other suitable motor they will pass a given point at such times and with such speed as to produce the desired effect. The strip may be made to move uniformly with the periphery of the wheel in any desired manner, as by means of spurs or spikes 10, which may project through holes 11 in the strip.

To prevent the strip from becoming disconnected from the pins or spurs on the periphery of the wheel, a thin strip 12, of steel or other suitable material, may be secured at one side of the box with its free end extended over a portion of the periphery of the wheel. When the spurs 10 are used upon the wheel, it may be desirable to use strippers 13 to disengage the strip from the wheel by passing between it and the periphery of the wheel and forcing it from the pins should it adhere thereto and have a tendency to be carried around with the wheel. In the drawings we have shown the spurs arranged substantially centrally to the periphery of the wheel and the ends of the strippers lying within grooves 14, near the edges of the wheel. This will cause the strippers to lie substantially tangential to the periphery of the wheel and in a line with the movement of the strip and between the wheel and the slot 7 in the casing, where the strip passes out of the box.

In passing the strip to the wheel it may be found desirable to place it under tension, which can be done by passing it under a suitable brake. This brake can be located in the slot 7'—as, for instance, a cushion 15 on one or both sides of the strip—and an adjusting-wedge 16 inserted under one of the cushions to graduate the pressure of the brake.

To cause the pictures of the series to appear as at the same place, it is necessary that such movements be given to the reflector upon its axis or otherwise as will hold the direction of each of the rays of light stationary through a given point whatever may be the angle of the incident rays from the object to the reflector.

As the objects or pictures must succeed each other with sufficient rapidity to continuously impress the eye, it is evident that the reflector can only follow each picture a certain distance, when it must resume its initial position and follow the succeeding picture. As the return movement of the reflector does not assist the correct representation of the pictures, it should be made as quickly as possible, and, if desired, the rays of light from the pictures might be intercepted for that instant, so that there would be no reflection except during the forward movement of the reflector.

A plurality of reflectors may be arranged to successively reflect the succeeding pictures, one form of which is shown in Fig. 4.

In the drawings, which illustrate a machine having but one reflector 5, we have shown it secured upon pivots 18 and provided with an arm 19, the free end of which engages with a series of pins 17, forming shoulders upon the wheel or roller 2. The parts are so arranged that one picture will pass a given point or be exposed to view for each time that the reflector is oscillated or moved forward. The return movement of the reflector may be accomplished by any suitable mechanism—as, for instance, by a weight or spring 20—which will draw the arm 19 back into its initial position to be engaged by the succeeding pin on the wheel.

Instead of the arms and pins above referred to the reflector and wheel or strip may be connected and caused to move synchronously in any desired manner, the only requisite being that the return movement of the mirror be quick, so as to come as near making a continuous or unbroken reflection as possible. The size of the reflector may be made to correspond with the size of the pictures, and the apertures or slots through the side of the casing, through which the pictures are observed, may be made accordingly.

When the parts are inclosed in a box, as shown, with the reflector below the strip, it is necessary to provide some means for illuminating the pictures, which can be done by an ordinary reflector 22, arranged in such manner as to reflect the light passing through an aperture 23 in the side of the box upon the picture, or an ordinary lamp or incandescent or other light can be arranged within the box so as to illuminate the picture either by reflection or transparently—that is, the light transmitted through the transparency; but when the parts are arranged in an open framework or the reflector is located above the strip and the top of the box removed the means for illumination may be dispensed with.

In using our machine one of the sides of the box is preferably made removable, so that the strip or objects to be used may be placed upon the wheel under the spring and the brake properly adjusted. The removed portions are then replaced, the wheel rotated, and the objects are seen in the reflector.

If desired, the pictures may be placed directly upon the periphery of the wheel, in which case the pins 10, strippers, and spring may be dispensed with. Lenses 24 may also be placed between the reflector and the pictures or the eye, whereby the apparent size of the picture may be changed, and by using two visual openings and properly arranged pictures or objects the usual stereoscopic effects can be produced.

In addition to the foregoing adaptations and use our invention may be applied and used in the observation of any moving objects—as, for instance, machinery. In this construction it is only necessary that the reflector be moved at such angular rate of speed with reference to that of the moving object to be observed as will cause the image of the object to stand still when seen in the reflector. This may be accomplished in any suitable manner, as by connecting the reflector with the moving object, as shown in Fig. 5, in which 25 indicates the reflector, 26 a walking-beam of an engine, (the object to be observed,) and 27 and 28 the means for connecting the two together. In this construction when the beam is moving in one direction the reflector is moved such a distance and at such a rate of speed that the reflection of the virtual image of the portion of the beam being observed will appear at the same place during the entire length of the stroke, and as soon as the beam starts in the opposite direction the movement of the reflector is changed accordingly and moved at such a rate of speed as will cause the image to still remain stationary.

In view of the wide use and scope to which our invention may be applied we wish it to be understood that we do not limit ourselves to the construction herein shown or described, but include all such changes and alterations as will come within the scope and spirit of our invention.

Having thus described our invention, we claim—

1. The herein-described method of directing light-rays, consisting in holding each of the rays of light from a series of moving objects stationary through a given point, substantially as set forth.

2. The herein-described method of forming an impression upon the eye, consisting in causing the rays of light from a series of moving objects, each to be held stationary through a given point, substantially as set forth.

3. In combination with a movable object, a movable reflector connected therewith, whereby the relative positions of the one to the other are changed so that the rays of light from the object will each be held stationary by the reflector through a given point, substantially as set forth.

4. In a kinetoscope, the combination, with a series of movable objects, of a movable reflector, and means for changing the relative positions of the objects and the reflector to each other, so that the rays of light from each succeeding object will each be held stationary by the reflector through a given point, substantially as set forth.

5. In a kinetoscope, the combination, with a series of movable pictures, of a movable reflector, and means for changing the relative positions of the pictures and the reflector to each other, so that the rays of light from each succeeding picture will each be held stationary by the reflector through a given point, substantially as set forth.

6. In a kinetoscope, the combination, with a series of movable pictures, of an oscillating reflector, and means for changing the relative positions of the reflector and the pictures to each other so that the rays of light from each picture will each be held stationary by the reflector through a given point, substantially as set forth.

7. In a kinetoscope, the combination, with a series of movable objects, of a movable reflector, and means for moving the reflector at such an angular rate of speed relatively to that of the objects that the rays of light therefrom each will be held stationary through a given point, substantially as set forth.

8. In a kinetoscope, the combination, with a series of movable pictures, of a movable reflector, and means for moving the reflector in one direction at a greater rate of speed than in the other, so that the time of exposure will be greater than the time of change, substantially as set forth.

9. In a kinetoscope, the combination, with a support, of a wheel journaled therein, an oscillating reflector, a series of pictures upon the wheel, and means for moving the wheel and the reflector in such relation to each other that the rays of light from the object will each be held stationary through a given point, substantially as set forth.

10. In a kinetoscope, the combination, with a support, of a wheel journaled therein, an oscillating reflector, radially-projecting pins upon the periphery of the wheel, a perforated strip upon the pins and provided with pictures, a retaining device upon the strip on the periphery of the wheel, and means for moving the pictures and the reflector in such relation to each other that the rays of light will each be held stationary through a given point, substantially as set forth.

11. In a kinetoscope, the combination, with a support, of a wheel journaled therein, an oscillating reflector, the periphery of the wheel being grooved and provided with radially-projecting pins, strippers within the support, the free ends of which fit within the grooves of the wheel, a retaining device, and means for moving the wheel and the reflector in such relation to each other that the rays of light from each succeeding picture will each be held stationary by the reflector through a given point, substantially as set forth.

12. In a kinetoscope, the combination, with a support, of a wheel journaled therein, an oscillating reflector, a series of pins arranged in one side of the wheel, an arm from the axis of the reflector, the free end of which is adapted to be engaged by said pins, means for returning said arm and reflector to their initial position, and a series of pictures upon the wheel, substantially as set forth.

13. In a kinetoscope, the combination, with a support, one wall of which is provided with two slots, of a wheel and an oscillating reflector journaled within the support, a brake in one of the slots, and strippers extending from the other slot to the periphery of the wheel, a strip through said slots and extending around the periphery of the wheel, and means for moving the pictures and the light in such relation to each other that the rays of light from each succeeding picture will each be held stationary by the reflector through a given point, substantially as set forth.

14. In a kinetoscope, the combination, with a support, of a movable object therein, a source of illumination, and means for holding each of the rays of light therefrom stationary through a given point, and lenses for changing the apparent size of the object, substantially as set forth.

In testimony whereof we affix our signatures in presence of two witnesses.

WILLARD G. STEWARD.
ELLIS F. FROST.

Witnesses:
Jos. H. BLACKWOOD,
W. S. BOYD.